United States Patent [19]

Allen

[11] 3,870,507

[45] Mar. 11, 1975

[54] CONTROL OF POLLUTION BY RECYCLING SOLID PARTICULATE STEEL MILL WASTES

[75] Inventor: John E. Allen, Lake Forest, Ill.

[73] Assignee: Ferro-Carb Agglomeration Ltd., Inc., Chicago, Ill.

[22] Filed: May 14, 1973

[21] Appl. No.: 359,776

[52] U.S. Cl............................................ 75/4, 75/25
[51] Int. Cl.................................................. C21b 1/28
[58] Field of Search.................................... 75/4, 25

[56] References Cited
UNITED STATES PATENTS

| | | | |
|---|---|---|---|
| 2,631,178 | 3/1953 | Morton | 75/25 UX |
| 2,780,536 | 2/1957 | Carney | 75/25 X |
| 3,374,085 | 3/1968 | Stone | 75/25 X |
| 3,725,034 | 4/1973 | Joseph et al. | 75/4 |

FOREIGN PATENTS OR APPLICATIONS 245,760  5/1960  Austria................................. 75/4

*Primary Examiner*—Allen B. Curtis
*Attorney, Agent, or Firm*—Milton Zucker

[57] ABSTRACT

Solid particulate steel mill wastes, such as blast furnace flue dust, basic oxygen furnace dust, mill scale, coke braise, fluxes and the like, which contain iron, iron oxides, carbon and other constituents, are briquetted with 2 to 15 percent (preferably 3 to 10 percent) hydrocarbonaceous binder of the total dry weight of the waste fines, and the raw briquettes are treated with an oxygen-containing gas at 350° to 600°F to selectively react with the hydrogen in the binder, to obtain strong briquettes which can be fed back into iron-or steelmaking process as a source of iron and/or carbon.

3 Claims, No Drawings

CONTROL OF POLLUTION BY RECYCLING SOLID PARTICULATE STEEL MILL WASTES

BACKGROUND OF THE INVENTION

1. Field of the Invention

This invention is concerned with the control of pollution in steel mill operation, by the recycle of the particulate solid fines which are produced in vast quantities in all such operations.

2. The Prior Art

Steel mill operations generally involve the production of liquid pig iron from ore with coke (ordinarily produced on site) and flux, the conversion of this liquid iron to steel, and the formation of the steel into shapes. Each one of these operations produces particulate solid wastes which must be disposed of by recovery of the metallics for best economics. In the past, the disposal, generally by the sintering process, was a source of pollution and much of the carbon in the waste was consumed.

In a typical iron-producing operation, iron oxide ore, flux and the reductant - coke - are charged into a blast furnace, where the charge is smelted and the iron oxide is reduced to iron, resulting in liquid pig iron and a slag which are recovered as molten products. The high temperatures and the rush of air (at velocities in excess of 10 feet per second) carry off large quantities of fines, which are removed in dust-recovery systems either dry or as a sludge. This blast furnace dust is a mixture of iron oxides, carbon, lime dust, and ash components. In either form, it presents a serious disposal problem, since about 2.5 tons of dry weight dust and sludge are produced for each 100 tons of iron.

When the pig iron is converted into steel, in the open hearth or basic oxygen furnace, high iron oxide dusts are produced. However, they too present a serious disposal problem, as a major proportion is submicron in particle size and since about 1.5 tons are produced for each 100 tons of raw steel.

Another source of particulate waste is that obtained from the steel-forming processes. The steel ingots, billets and other semifinished forms are reheated in furnaces and converted into shapes such as sheets, bars and structural forms in continuous rolling mills, which force hot oxidized particles, known as scale, from the billets or other shapes during the operation. This mill scale is largely particulate magnetic iron oxide ($Fe_3O_4$) and generally contains varying quantities of oil and grease; hence, it too presents a disposal problem.

Dumping or sale of these wastes is not economical, as the metallic oxide and carbon units contained therein are valuable. Moreover, it is gradually being prohibited by statute. Sintering has been the most common means of agglomeration heretofore practiced, but because it involves high temperatures and high gas volume has been a very serious air pollution source. The correction of this problem has resulted in ever increasing cost for construction and operation of pollution control facilities. The sintering process further burns (oxidizes) away much of the carbon in order to produce a semiplastic condition, thus resulting in loss of substantial heat values. Hot briquetting, though widely discussed, has not proven commercially practical, as it is very expensive and cannot successfully agglomerate carbon fines. Processes using varying types and amounts of cement have added slag-forming ingredients, and all have displayed a loss of bonding strength at high temperatures. It is therefore evident that the most desirable agglomeration should be one which can be operated at low temperatures and low gas volumes in order to provide a low level of pollution. The process should also be capable of retaining all valuable ingredients while producing an agglomerate that is stable at high temperatures with good load-bearing strength and of uniform size.

STATEMENT OF THE INVENTOR

I have discovered that typical finely divided steel mill wastes, such as blast furnace dusts, steel furnace dusts, mill scale, and coke dust, can be economically formed into briquettes which are strong enough to be recycled predominantly into the iron-making process. In accordance with my invention, finely divided wastes containing iron are formed into briquettes with about 2 to 15 percent, and preferably about 3 to 8 percent, based on total briquette weight, of a hydrocarbonaceous binder which has a ball and ring softening point below 212°F (ASTM Method: E28-58T) and is essentially free of substantial amounts of combustibles volatilizing below 500°F. After formation, the briquettes are heated to between 350° and 600°F, for between about 30 and 90 minutes, in an atmosphere containing at least 10 percent oxygen; the oxygen reacts selectively with the hydrogen and unsaturated hydrocarbons in the binder, producing a marked exotherm (300 to 350 BTUs per pound of binder). The partially dehydrogenated briquettes so produced may be cooled; the cooled briquettes are strong enough to be fed into a blast furnace, open hearth or cupola, and the iron and carbon values in the briquettes recovered.

For use in situations where a low-volatile briquette is desired, as in cupolas and electric furnaces, the briquettes are preferably devolatilized to −3 percent volatiles by heating in inert gas at temperatures above 1,400°F.

I have established that in this operation much of the iron oxides in the briquettes is reduced to iron, and iron carbide is formed at the particle interfaces, and that this iron carbide formation results in remarkable strength of the dehydrogenated briquettes, despite the very low original binder content.

DETAILED DESCRIPTION OF THE INVENTION

The process of this invention is useful in disposal of almost all solid particulate waste products which inevitably occur in an integrated iron and steel plant operation. As pointed out in the discussion of the prior art, these wastes include (but are not limited to) coke screenings, blast furnace dusts, wet or dry, steel furnace dusts, flux fines and mill scale. Actually, the process can be used to encompass coke braise (the fines from coke oven operations) and floor sweepings as well; it is, however, necessary that the combined dusts contain a minimum of 5 percent of iron to obtain a satisfactory bond with the small percentage of binder used.

These fines are mixed in some convenient mixer (e.g., a pug mill) with the binder selected. The binder should be hydrocarbonaceous, have a ball and ring softening point (ASTM Method: E28-58T) of below about 212°F (for convenience in handling) and be free of substantial amounts of combustibles volatile at 500°F. Typical useful binders include coal tars and pitches, petroleum residue pitches or petroleum reforming bottoms, and the like. I have used tars with a 100°F softening point, and a viscosity of 5 relative to water, and pitches with softening points approaching 212°F; it is merely necessary to use a mixing temperature appropriate to the binder used, not exceeding about 75°F above its softening point. The presence of substantial amounts of naphthalene (or other combustibles volatilizing below 500°F) must be avoided because it will cause fires to occur in the dehydrogenating oven, with loss of process control.

At least 2 percent of binder is needed to get sufficient strength in the final briquettes for any purpose - at about 3 to 8 percent, optimum results are obtained. Up to 15 percent of binder may be used without penalty; binder levels above 15 percent not only add to process cost but tend to cause softening and deformation in the early stage of dehydrogenation.

The dust and binder are thoroughly mixed, as in a pug mill, at any suitable mixing temperature not in excess of about 75°F above the softening point of the binder. Higher temperatures are avoided to insure setting of the raw briquettes sufficiently to prevent deformation in the dehydrogenation step. Mixing is generally complete in 5 to 10 minutes, depending on the formulation and equipment used.

The mix is formed into shapes by extrusion, or by compaction as with a piston press, such as the Milwaukee type, or most preferably by roll-briquetting. The size of briquette made is dictated by the particular recycle equipment to be used and the application of the agglomerate. Blast furnaces are preferably charged with 2 inch briquettes; cupolas (e.g., a Whiting 4 to 8 feet diameter cupola) prefer larger briquettes (4×4×2 inches), while electric furnaces, open hearths and basic oxygen converters require somewhat smaller sizes than the blast furnace.

The raw briquettes are transferred from the forming device to the dehydrogenation oven. There, the briquettes are treated in a stream of oxygen-containing gas circulating at a temperature of 350° to 600°F for a time sufficient to cause substantial dehydrogenation and polymerization of the binder and reaction between the binder and the iron-bearing dust to form a firm bond. This product may be charged as is into a blast furnace, steel furnace or foundry cupola, or it may be further devolatilized if the end use so dictates.

Any type of furnace may be used for the dehydrogenation. Typically, I use a chain grate carrying a bed of briquettes about 12 inches high with heated air as the oxygen-containing gas. The reaction is rather slow at 350°F gas temperature, but is complete in about 90 minutes at 10 percent binder content, and in about 60 minutes at 5 percent content. At gas temperatures of 600°F, extreme care must be taken, but high speed of reaction obtains - as low as 30 minutes at 3 percent binder content. For optimum results, I prefer to operate at gas temperatures of about 400° to 500°F.

The reaction of the oxygen in the gas with the hydrogen in the binder is highly exothermic, producing about 300 to 350 BTUs per pound of binder. The air forced through the bed not only provides the oxygen, but acts to remove this heat of reaction. With a typical 12 inch high bed, the velocity necessary to remove this heat is between 3 and 10 feet per second (i.e., below 3 feet per second, fires occur; above 10 feet per second, the reaction tends to stop). The minimum $O_2$ content of the gas used for dehydrogenation is about 10 percent, although I prefer to operate with 15 percent or more oxygen.

In the dehydrogenation, the binder is carbonized to form a structure which is sufficiently strong to hold the briquette together under the forces of handling and final processing. In the absence of at least 5 percent of iron in the dust, such a dehydrogenated briquette, with 3 to 8 percent of binder, would have a crushing strength lower than is desirable. Since my briquettes are normally very strong, resisting force of from about 800 to 5,000 pounds per square inch, it seems clear that the iron present is essential for the production of satisfactory briquettes.

The partially dehydrogenated briquettes burn with a yellow flame, which is useful in both open hearth and blast furnace operations. When recycled in this fashion, the recovery of iron and carbon values in the briquettes, and the improvement in furnace operations, appear to result in the disposal of the wastes with an economic advantage.

For use in cupolas or electric furnaces, it is desirable that the briquettes are low in volatiles (under about 3 percent). For such uses, the dehydrogenated briquettes may be further processed to reduce the remaining volatiles to under 3 percent. Heating in inert atmosphere to 1,400° to 1,600°F for 10 to 20 minutes will accomplish this. Much of the iron oxide in the briquettes is reduced to iron at the same time, and iron carbide is formed at the interface, resulting in much greater crushing strengths.

The resultant products - whether partially dehydrogenated or further treated to low volatility - are strong and abrasion-resistant, and perform well in the uses for which they are intended.

Specific Examples of the Invention

The following specific examples are given by way of illustration only, and are not to be deemed to limit this invention.

Example 1

Disposal of waste from an integrated steel mill

A typical integrated steel mill operation was selected which produced about equal parts (dry basis) of dry blast furnace flue dust (about half iron oxide and half carbon, with some calcium oxide and ash), wet blast furnace scrubber cake (same composition, dry basis), mill scale from the rolling mill ($Fe_3O_4$ of approximately 72% Fe), and coke braise. A mixture of 25 pounds of each of these products (dry basis - 100 pounds total), ground to pass a No. 6 Tyler screen, was placed in a pug mill with 11 pounds of coke oven pitch, obtained by heating high-temperature coal tar to 150°F ball and mill softening point; the mixer was maintained at 200°F. The mixture was briquetted on a roll machine to 2×2×1 inch pillow briquettes, which were piled 12 inches high on a travelling grate, and exposed to combustion gas containing 18% $O_2$ at 375°F for 60 minutes. Half of the product was further devolatilized at 1,600°F for 15 minutes in a shaft kiln in an inert atmosphere. The following results were obtained:

|  | Partially Dehydrogenated | Devolatilized |
|---|---|---|
| Applied force necessary to break | 1,020 pounds | 1,400 pounds |

-Continued

|  | Partially Dehydrogenated | Devolatilized |
| --- | --- | --- |
| Volatile matter | 5.5% | 1.0% |
| Behavior on heating to 2300°F | Burns with bright yellow flame, then sinters with some melting | Does not burn; becomes cherry red to white, sinters, fuses and melts to metal. |

Example 2

Mill scale and coke braise

Seventy-five pounds of mill scale ground to −6 mesh, 25 pounds of coke braise ground to −6 mesh, and 6 pounds of petroleum asphalt, 120°F ball and ring softening point, were mixed at 150°F in a pug mill as in Example 1, and formed into cylinders 1-½ inches in diameter and 1-½ inches high. They were treated in air at 525°F for 45 minutes. The resultant product had the following characteristics:

Applied force necessary to crush - 4,200 pounds
Volatile matter - 3 percent
Behavior on burning in air at 3,500°F - burns with bright yellow flame, turns cherry red, then white, with sintering and melting.

Example 3

Mill scale

Two hundred pounds of mill scale ground to −6 mesh and 6 pounds of high-temperature coke oven pitch (tar distilled to 150°F ball and ring softening point) were blended at 200°F in a pug mill as in Example 1, and formed into 2×2×1 inch pillow briquettes. They were treated in combustion gas containing 15 percent of oxygen at 400°F on a grate in a bed 12 inches high, passing air through the bed at 3 feet per second. Half of the partially dehydrogenated briquettes were further devolatilized at 2,000°F in nitrogen for 15 minutes, and cooled under nitrogen. The following results were obtained:

|  | Partially Dehydrogenated | Devolatilized |
| --- | --- | --- |
| Applied force necessary to destroy | 900 pounds | 1,200 pounds |
| Volatile matter | 2.0% | 1.0% |
| Total iron | 71.3% | 71.3% |
| Free iron | 0.0% | 17.8% |
| Behavior on heating in air to 3500°F | Burns with bright yellow flame, then sinters with some melting | Sinters with some melting. |

Example 4

Integrated fluxes

In situations where an iron-bearing substance, i.e., an ore, contains a contaminant, a gangue, that must be removed in the smelting process, it is normal practice in iron-making to add a fluxing agent, as limestone or burnt lime, that preferentially reacts with the gangue, usually containing silica, to form a slag that floats on the smelted free iron in the furnace and can be removed by a simple decanting. Example 4 is a simulated mix of pure materials that simulates an extreme situation for dry blast furnace dust:

One hundred pounds of pure iron oxide ($Fe_3O_4$) - dry, 10 pounds of pure silica (quartz) ($SiO_2$) - dry, 20 pounds of pure burnt lime (CaO) - dry, and 5 pounds of petroleum asphalt (180°F softening point) - dry, were added to a pug mill mixer and mixed for approximately 15 minutes at 250°F. This hot mix was then passed between the rolls of a briquetting press containing pockets for forming pillow briquettes of 2 inches in length, 2 inches in width and 1 inch in thickness. These forms were heat-treated in an air atmosphere at a velocity of 5 to 7 feet per second through the bed of briquettes piled 12 inches high for 45 minutes. These heat-treated briquettes were cooled for handling, to prevent personnel injury, and analyzed as follows:

| Crushing strength | 875 | pounds total force |
| --- | --- | --- |
| Volatile matter | 2.0% |  |
| Total iron | 61.3% | by weight |
| Free iron | 0.0% | by weight |
| Calcium oxide | 8.5% | by weight |
| Silicon dioxide | 4.2% | by weight |
| Devolatilized petroleum asphalt carbon | 1.8% | by weight |

The remaining components were not analyzed for, but consisted of iron-bound oxygen and hydrogen released as water.

Limestone or any similar flux may be substituted without detriment to quality. In fact, the addition of limestone, because of its insolubility in water, lends desirable storage ability to the heat-treated briquettes.

In the examples, the force to break or crush is total force applied between the jaws of an hydraulic press, as measured on the press gauge. Volatile matter was determined by ASTM Test: D 271-64; the softening points of the binders were determined by ASTM Test: E28-58T. The burning was conducted in air with a flame from an oxyacetylene torch, rated at 3,500°F.

Each of the products of each example has properties which indicate it to be useful either in blast furnaces or open hearths in the case of the partially dehydrogenated products, or the cupolas, electric furnaces or oxygen furnaces in the case of the devolatilized products.

The examples can obviously be multiplied indefinitely without departing from the scope of the invention as defined in the claims.

I claim:

1. In the operation of a steel mill, the method of disposing of iron- and carbon-containing particulate waste of principally dust size which comprises (1) mixing the particulate waste containing at least 5% of Fe with 2 to 15%, based on total weight of waste and binder, of a bituminous binder having a ball and ring softening point below 212°F and being free of combustibles volatile at 500°F, to produce a briquettable mix consisting essentially of the said particulate waste and the said binder; (2) briquetting the mix; (3) heating the briquettes in gas containing at least 10% of oxygen at a gas temperature of 350° to 600°F for 30 to 90 minutes to selectively remove hydrogen from the binder and induce a cementing reaction between the binder and the iron-containing waste to produce briquettes strong enough to be charged into plant processes; and (4) recycling said heat-treated briquettes into the plant processes to recover their iron and carbon values.

2. The method of claim 1, in which the briquettes are further heated, between steps 3 and 4, in an inert atmosphere at a temperature above 1,400°F to reduce the volatiles below 3 percent and produce metallic iron to form an iron carbide bond at particle interfaces.

3. The method of claim 1, in which the binder content is between 3 and 8 percent by weight of the mix.

* * * * *